Patented Apr. 13, 1943

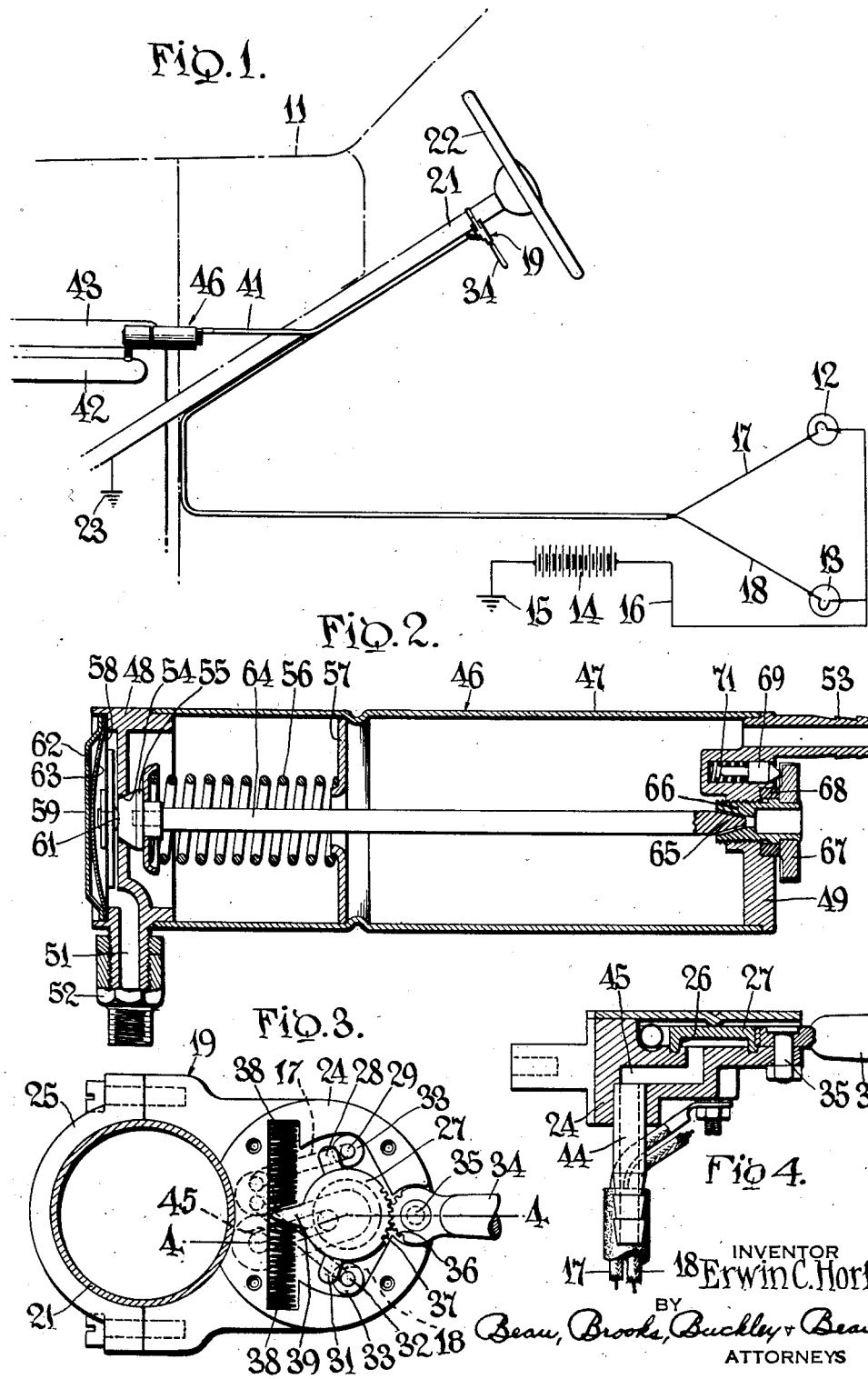

2,316,584

UNITED STATES PATENT OFFICE 2,316,584

DIRECTION INDICATOR

Erwin C. Horton, Hamburg, N. Y., assignor to Trico Products Corporation, Buffalo, N. Y.

Application November 19, 1938, Serial No. 241,449

14 Claims. (Cl. 177—329)

The present invention relates to a device for delaying operation of a fluid operated or controlled mechanism, such as the return motion of a turn signal for a motor vehicle.

For example, in my Patent No. 2,142,055, granted December 27, 1938, is disclosed a turn signal for vehicles wherein the signal is held in either of two operated positions by suction derived from the engine manifold, the signal returning from an operated position to a rest position when the degree of suction decreases, as when the engine is accelerated upon completion of the turn. It has been found that in some instances during normal operation the engine may be accelerated before the car has gotten well into a turn, with the result that the signal is prematurely returned to non-operating condition, and therefore, it has been found desirable to delay the return action.

The device of the present invention operates to delay the decrease of suction effective at the apparatus, and may, therefore, be used in conjunction with the apparatus shown in my prior application for patent with the effect of delaying the return motion of the signal from operating position. The device may, of course, also be used in other relationships for slowly venting to the atmosphere the fluid pressure within the system.

These and other objects and advantages will become apparent from the following description of the typical embodiment of the invention shown in the accompanying drawing, wherein:

Fig. 1 is a schematic view showing the device of my invention applied to the turn signal mechanism of a motor vehicle;

Fig. 2 is a longitudinal sectional view through the device;

Fig. 3 is a plan view of the control unit of the signal apparatus with the cover plate thereof removed; and Fig. 4 is a vertical section taken on the line 4—4 through the unit shown in Fig. 3.

As shown in Fig. 1, the vehicle 11 is provided with a turn signal including an electric lamp 12 for indicating a right turn when lighted, and an electric lamp 13 for indicating a left turn when lighted. The lamps may be energized by a battery 14 having one terminal grounded at 15 to the vehicle, and having a wire 16 connected to the lamps. Extending from the lamps 12 and 13 to a control unit 19, preferably mounted on steering column 21 adjacent steering wheel 22, are wires 17 and 18 respectively. Column 21 is grounded at 23, and illumination of either lamp may be effected by operation of control unit 19 to close either wire 17 or wire 18 to the ground 23.

Control unit 19 comprises metallic casing 24 which may be held by clamp 25 to the grounded column 21, the casing having a circular groove receiving the peripheral flange 26 of a metallic member 27 which has a contact 28 adapted to close against a fixed contact 29 when member 27 is rotated clockwise (Fig. 3) within the groove, and a contact 31 adapted to close against a fixed contact 32 when member 28 is rotated counter-clockwise. Fixed contacts 29 and 32 are respectively connected to wires 17 and 18, and are mounted in casing 24 but insulated therefrom by insulators 33.

A control handle 34 pivoted to the casing by pin 35 has gear teeth 36 meshing with teeth 37 on member 27, so that the latter is partially rotated in a clockwise direction to close the circuit through lamp 12 (via wire 16, lamp 12, wire 17, contacts 29 and 28, the metallic parts of the control unit and the steering column to the grounded side of the battery) when handle 34 is moved to the right (up in Fig. 3), and partially rotated counter-clockwise to close the circuit through lamp 13 (the circuit including contacts 32 and 31) when handle 34 is moved to the left, from the neutral position shown in Fig. 3. Springs 38 engage a finger 39 which extends from member 27 to normally retain the parts in the neutral position shown in Fig. 3, and to return them to this position after they have been moved to either contact closing position.

A conduit 41 communicating with intake manifold 42 of the vehicle's engine 43 is connected by nipple 44 to a port 45 in control casing 24, the port being exposed to the under surface of member 27, so that when suction at the manifold is normal, the member 27 is held upon its seat within the circular groove with sufficient pressure to prevent its return from either operated position under the urge of springs 38. When the suction is of a lesser degree, as when the engine throttle is opened after a turn is completed, the springs may return the parts to neutral position as previously set forth.

Interposed between the manifold 42 and conduit 41 is device 46 for delaying and controlling the dissipation of suction within conduit 41, and hence, delaying and controlling the return of the signal apparatus to neutral condition. Device 46 includes a casing made up of a tube 47 and heads 48 and 49 therefor, head 48 having a fluid outlet port or passage 51 adapted for fluid communication with manifold 42 through a nipple 52, and head 49 having a nipple 53 for connection to conduit 41.

Head 48 has a valve opening 54 normally closed by valve 55 normally held seated by a spring 56 backed by a perforated wall 57 that extends across tube 47. A flexible diaphragm 58, having its periphery held against the outer end of head 48 by a closure disc 59, carries at its center a member 61 abutting valve 55. The closure disc 59 has an air vent 62.

Disposed between disc 59 and diaphragm 58 is a substantially rigid disc 63 of porous paper, or the like, allowing a seepage of air therethrough. By this arrangement the diaphragm 58 will be moved toward valve opening 54 when suction at the manifold and in port 51 is high, and in so moving will effect opening of valve 55 against the resistance of spring 56. Upon decrease of suction at the manifold and in port 51 the spring will close valve 55. Fluttering motions of the diaphragm and valve are damped out by the porous disc 63 permitting only relatively slow displacement of air from or into the space between disc 63 and diaphragm 58.

Rigid with valve 55 is valve stem 64 which has a tapered valve 65 within a valve seating member 66 that is screw-threaded into head 49. The valve seat of member 66 has a taper corresponding to that of valve 65 and provides an atmospheric vent to the interior of tube 47 when valve 65 is unseated. On the outer end of member 66 is an adjusting wheel 67 by which the member may be manually adjusted relative to head 49, and between these two parts is a gasket 68 of rubber or like resilient material for preventing leakage of air past the screw-threaded portions of the head and valve seating member. The surface of the wheel is preferably fluted or knurled in order to provide a finger-hold, and a detent 69 backed by a spring 71 is slidably mounted in head 49 to releasably engage the fluted wheel, preventing accidental turning of the latter although permitting manual adjustment thereof when desired.

The device is preferably so adjusted that in operation normal suction of the manifold will be effective on diaphragm 58 to open valve 55 and shift valve stem 64 so as to close valve 65. Thereupon, air will be withdrawn from the interior of tube 47 and conduit 41 to hold the signal apparatus in the manner hereinbefore described. Upon decrease of manifold suction, valve 55 will be closed by spring 56 and valve 65 opened to bleed air into the interior of the tube and conduit 41, thereby releasing the holding action on the signal apparatus. The rate of release will be slow, however, due to the relatively large volumetric capacity of the chamber within tube 47, and the small area of the opening past valve 65. The rate of release may be varied by screwing the valve seating member 66 in or out with respect to head 49, as hereinbefore described, which will vary the permissible maximum area of the opening past valve 65.

In order that the exhaust of air from the device past valve 55 may be much more rapid than the inlet of air past valve 65, the latter is preferably much smaller than valve 55 and its taper of much smaller angle.

It will be understood that the device 46 may be used in connection with apparatus other than turn signals, wherever a slow release of pressure differential is desired, and further, that the device 46 is merely illustrative of the inventive principles involved, which may be embodied in other physical forms without departing from the invention or the scope of the appended claims.

I claim:

1. In a signal, signal means changeable from one to another indicating condition, fluid pressure means for holding the signal means in one of said conditions when the pressure is of predetermined differential from atmospheric pressure and otherwise allowing the signal means to return to the other indicating condition, a chamber in fluid communication with the fluid pressure holding means, said chamber having a fluid passage connectible to a source of fluid pressure and said chamber having an atmospheric vent, a valve for said passage, and means responsive to the fluid pressure in said passage for closing said valve when the pressure is of less than predetermined differential from atmospheric pressure.

2. In a signal, signal means changeable from one to another indicating condition, fluid pressure means for holding the signal means in one of said conditions when the pressure is of predetermined differential from atmospheric pressure and otherwise allowing the signal means to return to the other indicating condition, a chamber in fluid communication with the fluid pressure holding means, said chamber having a fluid passage connectible to a source of fluid pressure, said chamber having an atmospheric vent and adjustable valve means for varying the size of said vent, a valve for said passage, and means responsive to the fluid pressure in said passage for closing said valve when the pressure is of less than predetermined differential from atmospheric pressure.

3. In a signal, signal means changeable from one to another indicating condition, fluid pressure means for holding the signal means in one of said conditions when the pressure is of predetermined differential from atmospheric pressure and otherwise allowing the signal means to return to the other indicating condition, a chamber in fluid communication with the fluid pressure holding means, said chamber having a fluid passage connectible to a source of pressure, said chamber having an atmospheric vent, a valve for said passage and a valve for said vent, and means responsive to the fluid pressure in said passage for closing the passage valve and opening the vent valve when the pressure is of less than predetermined differential from atmospheric pressure.

4. In a signal, signal means changeable from one to another indicating condition, fluid pressure means for holding the signal means in one of said conditions when the pressure is of predetermined differential from atmospheric pressure and otherwise allowing the signal means to return to the other indicating condition, a chamber in fluid communication with the fluid pressure holding means, said chamber having a fluid passage connectible to a source of pressure, said chamber having an atmospheric vent, a valve for said passage and a valve for said vent, means responsive to the fluid pressure in said passage for closing the passage valve and opening the vent valve when the pressure is of less than predetermined differential from atmospheric pressure, and means for adjusting the maximum opening of the vent valve.

5. In a fluid pressure device, a chamber having an atmospheric vent for bleeding air thereinto, a passage communicating with a source of suction and with said chamber, a valve for closing the passage from said chamber and a valve for said vent, means relating the valves so that one is closed when the other is open, spring means for normally holding the passage valve closed, and diaphragm means unattached to said valve in said passage for opening the passage valve when the suction in the passage is of greater than a predetermined degree.

6. In a fluid pressure device, a chamber having an atmospheric vent for bleeding air thereinto, a passage communicating with a source of suction and with said chamber, a valve for closing the passage from said chamber and a valve for said vent, means relating the valves so that one is closed when the other is open, spring means for normally holding the passage valve closed, diaphragm means in said passage for opening the passage valve when the suction in the passage is of greater than a predetermined degree, and means for regulating the maximum opening of the vent valve.

7. In a fluid pressure device, a chamber having an atmospheric vent for bleeding air thereinto, a passage communicating with a source of suction and with said chamber, a valve on one side of the chamber for closing the latter from the passage and a valve on the other side of the chamber for closing the vent, said valves being substantially rigidly connected whereby one will open when the other closes, and fluid pressure means unattached to the passage valve for opening the latter when the suction in the passage is of greater than a predetermined degree.

8. In a fluid pressure device, a chamber having an atmospheric vent for bleeding air, a passage communicating with a region of subatmospheric pressure and with said chamber, a valve for closing the passage from said chamber and a valve for said vent, means relating the valves so that one is open when the other is closed, spring means for normally holding the passage valve closed, a diaphragm forming a wall portion of the passage, said diaphragm being subject on one side to atmospheric air and responsive to a predetermined pressure differential for opening the passage valve, and a porous wall between the diaphragm and the atmosphere for permitting slow seepage of atmospheric air from or against the outer face of the diaphragm to stabilize movements of the latter.

9. In combination with a vehicle engine providing a source of fluid pressure varying in response to engine operating condition, a signal, fluid pressure means for holding the signal operative when the pressure is of predetermined differential from atmospheric pressure and otherwise allowing the signal to become inoperative, a chamber in fluid communication with the fluid pressure holding means, said chamber having a fluid passage connectible to said source of fluid pressure and said chamber having an atmospheric vent, a valve for said passage, and means responsive to the fluid pressure in said passage for closing said valve when the pressure is of less than predetermined differential from atmospheric pressure.

10. In combination with a vehicle providing a source of fluid pressure varying in response to changes in the vehicle's operating condition, a signal, fluid pressure means for holding the signal operative when the pressure is of predetermined differential from atmospheric pressure and otherwise allowing the signal to become inoperative, a chamber in fluid communication with the fluid pressure holding means, said chamber having a fluid passage connectible to said source of fluid pressure, said chamber having an atmospheric vent and adjustable valve means for varying the size of said vent, a valve for said passage, and means responsive to the fluid pressure in said passage for closing said valve when the pressure is of less than predetermined differential from atmospheric pressure.

11. In combination with a vehicle providing a source of fluid pressure varying in response to changes in the operating condition of the vehicle, a signal, fluid pressure means for holding the signal operative when the pressure is of predetermined differential from atmospheric pressure and otherwise allowing the signal to become inoperative, a chamber in fluid communication with the fluid pressure holding means, said chamber having a fluid passage connectible to said source of pressure, said chamber having an atmospheric vent, a valve for said passage and a valve for said vent, and means responsive to the fluid pressure in said passage for closing the passage valve and opening the vent valve when the pressure is of less than predetermined differential from atmospheric pressure.

12. In combination with a vehicle providing a source of fluid pressure varying in response to changes in the operating condition of the vehicle, a signal, fluid pressure means for holding the signal operative when the pressure is of predetermined differential from atmospheric pressure and otherwise allowing the signal to become inoperative, a chamber in fluid communication with the fluid pressure holding means, said chamber having a fluid passage connectible to said source of pressure, said chamber having an atmospheric vent, a valve for said passage and a valve for said vent, means responsive to the fluid pressure in said passage for closing the passage valve and opening the vent valve when the pressure is of less than predetermined differential from atmospheric pressure, and means for adjusting the maximum opening of the vent valve.

13. A system of the class described, comprising a device manually operable from a normal position to a second position, fluid pressure means for holding the device in its manually operable second position when the pressure is of a predetermined differential from atmospheric pressure and otherwise allowing the device to return to its normal position, a chamber in fluid communication with the fluid pressure holding means, said chamber having a fluid passage connectible to a source of pressure and also having an atmospheric vent for slowly bleeding air, a valve for closing said passage and a valve for closing said vent, and means responsive to the fluid pressure in said passage for simultaneously operating the valves, the passage valve opening and the vent valve closing when the passage pressure differs from atmospheric pressure by more than a predetermined degree, and the passage valve closing and the vent valve opening when the passage pressure differs from atmospheric pressure by less than a predetermined degree.

14. A system of the class described, comprising a device manually operable from a normal position to a second position, fluid pressure means for holding the device in its manually operable second position when the pressure is of a predetermined differential from atmospheric pressure and otherwise allowing the device to return to its normal position, a chamber in fluid communication with the fluid pressure holding means, said chamber having a fluid passage connectible to a source of pressure and also having an atmospheric vent for slowly bleeding air, a valve for closing said passage and a valve for closing said vent, and means responsive to the fluid pressure in said passage for simultaneously operating the valves, the passage valve opening and the vent valve closing when the passage pressure differs from atmospheric pressure by more than a predetermined degree, and the passage valve closing and the vent valve opening when the passage pressure differs from atmospheric pressure by less than a predetermined degree, and means for adjusting the maximum opening of the vent valve.

ERWIN C. HORTON.